G. C. HARNDEN.
SEED TESTING DEVICE.
APPLICATION FILED NOV. 25, 1913.
1,123,281.
Patented Jan. 5, 1915.
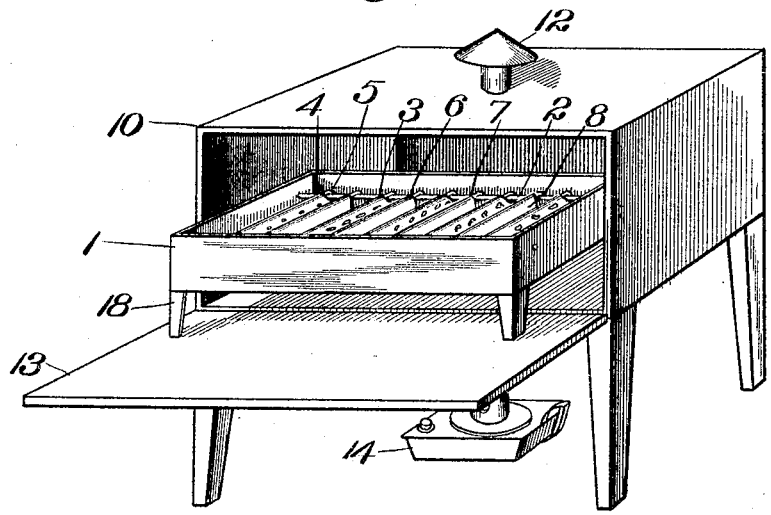
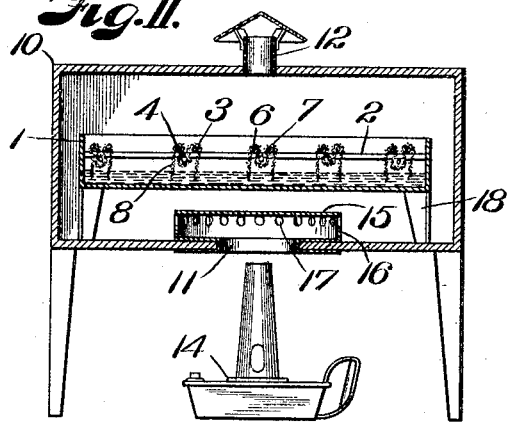
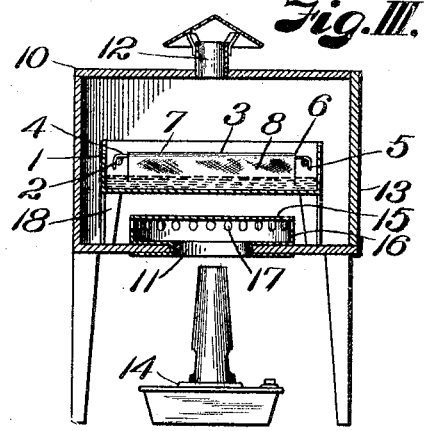
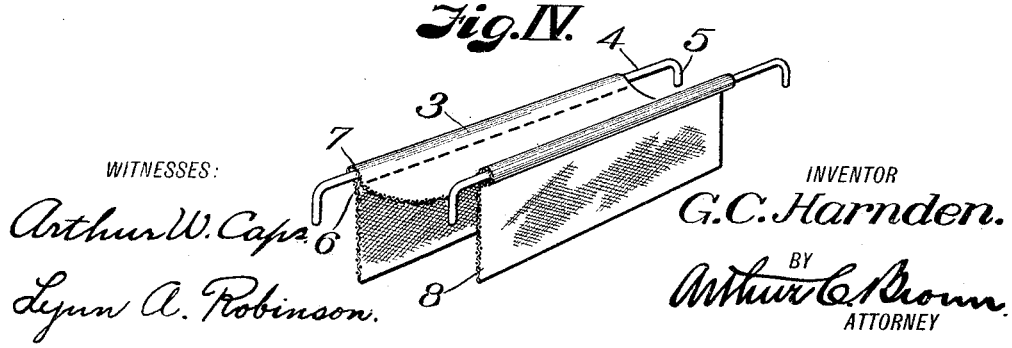
WITNESSES:
Arthur W. Capp
Lynn A. Robinson
INVENTOR
G. C. Harnden.
BY
Arthur C. Brown
ATTORNEY

UNITED STATES PATENT OFFICE.

GLEN C. HARNDEN, OF KANSAS CITY, MISSOURI.

SEED-TESTING DEVICE.

1,123,281.

Specification of Letters Patent. Patented Jan. 5, 1915.

Application filed November 25, 1913. Serial No. 803,031.

*To all whom it may concern:*

Be it known that I, GLEN C. HARNDEN, a citizen of the United States, residing at Kansas City, in the county of Jackson and State of Missouri, have invented certain new and useful Improvements in Seed-Testing Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a seed testing device, and has for its principal object to provide means for testing the fertility of garden, field, or other seed.

In accomplishing this object I have provided improved details of structure, the preferred form of which is illustrated in the accompanying drawings, wherein:—

Figure I is a perspective view of a seed testing device constructed according to my invention, and shown in combination with a preferred type of heater. Fig. II is a central, longitudinal section of the same. Fig. III is a central, transverse section of the same. Fig. IV is a detail perspective view of one of the individual seed pockets.

Referring more in detail to the parts:—

1 designates a pan, preferably constructed of galvanized iron, having rods 2 extending longitudinally therethrough, adjacent but spaced slightly from its sides, and adjacent the upper edges thereof, in order to support the individual seed pockets within and above the bottom of the pan. Each of the pockets 3 comprises paired rods 4, of such length that they may extend transversely across the pan 1 and lie on the opposite longitudinal rods, and having the downturned ends 5 for location between the rods and the sides of the pan, in order to hold the pocket rods on the longitudinal pan rods to prevent the ends of the pocket rods falling from their support on the longitudinal pan rods. Mounted on the rods 4 is a fabric pocket 6, having spaced channels 7 formed by sewing the material transversely, and through which the rods 4 are projected, so that when the pocket rods are supported on the pan rods, the central or carrying portion of the pocket may hang downwardly between the rods 4, with the ends 8 of the fabric suspended within the pan, so that they may be immersed in water contained within the pan.

In using the device, seeds are placed in the pockets 6 and the pockets closed by moving the paired rods 4, and when water is contained within the pan, moisture seeps upwardly through the depending flaps 8 to moisten the body of the pocket and the seeds contained therein, in order to properly moisten the seeds and provide the required humidity for germination.

In order to germinate the seeds, it is necessary to maintain a relatively high and constant temperature, and in order to accomplish this result I prefer to inclose the pan in a casing 10, having a lower intake opening 11 and flue 12, with a hinged side door 13, and to provide a lamp 14 which may be located below the opening 11, in order that heat from the lamp may flow into the interior of the casing and circulate about the pan to heat the water therein, and in order to provide proper distribution of heated air within the casing I preferably cover the lower opening with a plate 15, which is supported in the bottom of the casing by a rail 16, having lateral openings 17, through which heat from the lamp may be directed laterally beneath, instead of directly against, the bottom of the opening. With this construction, I provide the pan with legs 18, whereby it may be supported at a desirable elevation above the distributing plate 15.

In using the device, the pan 1, partially filled with water, is placed within the casing, seeds placed within the pockets 6, and pockets supported on the longitudinal pan rods and closed at the top by bringing the paired rods 4 close together. The casing is then closed and the lamp lighted and placed beneath the lower casing opening 11. Heat from the lamp will then pass upwardly into contact with the plate 15 and be deflected through the rail apertures 17 and distributed beneath the pan 1, so that water in the pan is heated evenly to provide a proper temperature and required humidity for germinating the seeds; moisture being drawn upwardly from the flaps 8, which are suspended into the water in the pan, to keep the pockets and seeds contained therein in a moist condition. After the seeds have been subjected to the moist heated atmosphere a sufficient time to germinate, the casing may be opened and the pan removed for inspection.

By providing pocket members, which may be easily removed from the rods 4, as described, the fabric portions may be cleaned as often as desired, and the device kept in a sanitary condition.

While I have described a specific type of heater for use in connection with the testing apparatus, I do not wish to be understood as limiting myself thereto, as other heaters may be used, or the testing pan may be placed on an ordinary range, or, in some instances, the heat may be supplied from the sun's rays.

Having thus described my invention, what I claim as new therein, and desire to secure by Letters-Patent, is:—

1. In a seed testing device, a pan and a pocket comprising a fabric member of absorbent material having transverse channels in fixed spaced relation forming a central body portion and loose end flaps, rods extending through said channels, and means for supporting the rods in said pan, whereby the central body portion is supported above the lower edges of the depending end flaps and above the base of the pan.

2. In a seed testing device, a pan, rods fixed to and spaced from the sides and bottom of said pan, and a pocket supported on said rods comprising a fabric member of absorbent material having spaced tubular channels, a central body portion between said tubular channels and end flaps depending from the body portion, and a rod projected through each of said tubular channels and having downturned ends for sliding engagement with said pan rods, whereby said central body portion may be opened or closed, substantially as specified.

3. In a seed germinating device, a pan, rods fixed to and spaced from the sides and bottom of said pan, a pocket supported on said rods comprising a fabric member of absorbent material having spaced tubular channels, a central body portion between said channels, end flaps depending from said channels, and rods slidably mounted on said pan rods and adapted for projection through said tubular channels, whereby the central body portion may be opened or closed without changing the relative position between the end flap and the bottom of the pan.

In testimony whereof I affix my signature in presence of two witnesses.

GLEN C. HARNDEN.

Witnesses:
ARTHUR W. CAPS,
L. E. COATS.